United States Patent
Ogasawara

(10) Patent No.: US 7,499,683 B2
(45) Date of Patent: Mar. 3, 2009

(54) WIRELESS BROADCAST RECEIVING DEVICE FOR VEHICLE

(75) Inventor: Akihiro Ogasawara, Toyokawa (JP)

(73) Assignee: DENSO CORPORATION, Kariya (JP)

( * ) Notice: Subject to any disclaimer, the term of this patent is extended or adjusted under 35 U.S.C. 154(b) by 452 days.

(21) Appl. No.: 11/447,005

(22) Filed: Jun. 6, 2006

(65) Prior Publication Data

US 2006/0276150 A1    Dec. 7, 2006

(30) Foreign Application Priority Data

Jun. 7, 2005    (JP)    ............................. 2005-167402
Feb. 24, 2006    (JP)    ............................. 2006-049302

(51) Int. Cl.
*H04B 1/04*    (2006.01)

(52) U.S. Cl. ..................... 455/132; 455/186.1

(58) Field of Classification Search ................. 455/132, 455/133, 179.1, 185.1, 186.1
See application file for complete search history.

(56) References Cited

U.S. PATENT DOCUMENTS 5,457,815 A * 10/1995 Morewitz, II ............ 455/161.1
5,584,051 A * 12/1996 Goken ......................... 455/68
6,052,569 A * 4/2000 Ehrhardt ................... 455/188.1
7,120,404 B2 * 10/2006 Gierl .......................... 455/132

FOREIGN PATENT DOCUMENTS

JP    A-2003-152575    5/2003
JP    U5-88032    11/2005

* cited by examiner

*Primary Examiner*—Nguyen Vo
(74) *Attorney, Agent, or Firm*—Posz Law Group, PLC

(57) ABSTRACT

A vehicle is provided with a navigation system that includes a traffic information receiver and a radio receiver. The traffic information receiver receives traffic information from one of multiple traffic information broadcasting stations having respective service regions. The radio receiver selectively receives (i) traffic information from one of the multiple traffic information broadcasting stations and (ii) a radio program from a radio broadcasting station. When the vehicle approaches a border between (i) a current service region where the traffic information receiver is receiving traffic information and (ii) a neighboring service region, whether the radio receiver is in use or not is determined. Based on the determination, the traffic information receiver or the radio receiver is tuned to a traffic information broadcasting station covering the neighboring service region.

13 Claims, 3 Drawing Sheets

WIRELESS BROADCAST RECEIVING DEVICE FOR VEHICLE

CROSS REFERENCE TO RELATED APPLICATIONS

This application is based on and incorporates herein by reference Japanese Patent Applications No. 2005-167402 filed on Jun. 7, 2005 and No. 2006-49302 filed on Feb. 24, 2006.

FIELD OF THE INVENTION

The present invention relates to a wireless broadcast receiving device for a vehicle.

BACKGROUND OF THE INVENTION

JP 2003-152575A discloses a device which includes a plurality of frequency division multiple receivers and tunes the respective receivers to channels for different broadcasting service areas. The device is thus capable of receiving traffic information of multiple regions.

A receiver is made for wirelessly receiving only traffic information from traffic information broadcasting stations (hereinafter, this receiver is called a traffic information receiver); another receiver is made for wirelessly and selectively receiving the traffic information and radio programs from radio broadcasting stations (hereinafter, this receiver is called a radio receiver). The traffic information broadcasting stations can be located in multiple regions (as prefectures or states); thereby, the traffic information may be received from more than one traffic information broadcasting station at a border between the regions. A system may include both the traffic information receiver and radio receiver. This system may be used in the above border, which may cause the problem below.

A vehicle having the system may come close to the border between a current region and a neighboring region while receiving traffic information of the current region by using one of the receivers included in the system. In this case, this system can further receive traffic information of the neighboring region by using the other receiver. Thus, the system can simultaneously receive traffic information of multiple regions. However, if the radio receiver has been tuned to a radio program by the user and is then suddenly tuned to the traffic information of the neighboring region simply upon approaching the border, the user cannot continue to listen to the radio program. This degrades a merit or user-friendliness in the radio receiver as a radio tuner.

SUMMARY OF THE INVENTION

It is an object of the present invention to provide a wireless broadcast receiving device for a vehicle, which can simultaneously receive traffic information of multiple regions while helping prevent degradation of a radio receiver in user-friendliness.

As an aspect of the present invention, a wireless broadcast receiving device for a vehicle is provided as follows: a first receiver is included for wirelessly receiving traffic information from one of a plurality of traffic information broadcasting stations; a second receiver is included for wirelessly and selectively receiving one of (i) traffic information from one of the traffic information broadcasting stations and (ii) a radio program from a radio broadcasting station; a storage device is included for storing correspondence data that associates each of the traffic information broadcasting stations with a certain region included in a plurality of regions, wherein traffic information broadcasted from the each of the traffic information broadcasting stations is receivable in the certain region; a position detector is included for detecting a current position of the vehicle; and a controller having a tuning unit and a determining unit is included. The tuning unit tunes the first receiver and the second receiver to the traffic information broadcasting stations based on the detected current position; the determining unit makes a determination whether the second receiver is in use when the vehicle approaches a border between (i) a current region including the current position and (ii) a neighboring region adjacent to the current region, while the first receiver is tuned to a first station of the traffic information broadcasting stations which is associated with the current region. The tuning unit selectively tunes one of the first receiver and the second receiver to a second station of the traffic information broadcasting stations which is associated with the neighboring region, based on the determination made by the determining unit.

The wireless broadcast receiving device thus does not simply tune the second receiver to the second station that broadcasts the traffic information of the neighboring region.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
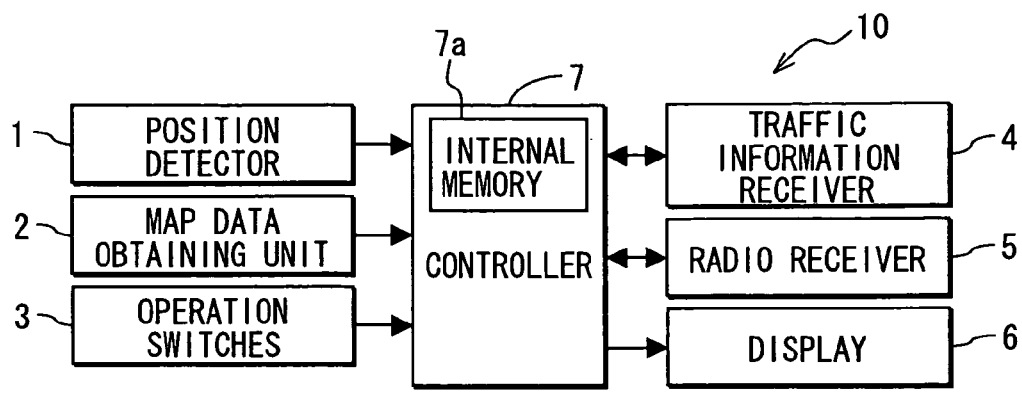
FIG. 1 is a block diagram showing a structure of a navigation system according to an example embodiment of the present invention.

Hereinafter, a wireless broadcast receiving device for a vehicle according to an example embodiment of the present invention is described with reference to FIGS. 1 and 2.

A navigation system 10 for a vehicle includes functions of an example of a controller of the wireless broadcast receiving device. As shown in FIG. 1, the navigation system 10 includes a position detector 1, a map data obtaining device 2, and operation switches 3. The position detector 1 detects a current position of the vehicle. The map data obtaining device 2 obtains map data and several kinds of data from an external storage device storing the map data and the several kinds of data. The operation switches 3 are used for a user to input instructions.

The navigation system 10 further includes a traffic information receiver 4, a radio receiver 5, a display device 6, and a controller 7. The traffic information receiver 4 is a radio tuner, which can be tuned only to traffic information broadcasting stations and wirelessly receive traffic information from the traffic information broadcasting stations. Each traffic information broadcasting station broadcasts traffic information to one of multiple regions (for example, administrative districts such as prefectures or states) into which an area (such as a country) has been previously divided. Traffic information broadcasted in a certain region is related to the certain region. Each region can be called a service region of one of the traffic information broadcasting stations.

The radio receiver 5 is a radio tuner which can be selectively tuned to (i) a radio broadcasting station or (ii) one of the traffic information broadcasting stations to wirelessly receive (i) a radio program from the radio broadcasting station or (ii) traffic information from the one of the traffic information broadcasting stations, respectively.

The display device 6 displays map images or pictures of a television program. The controller 7 controls the position detector 1, the map data obtaining device 2, the operation switches 3, the traffic information receiver 4, the radio receiver 5, and the display device 6.

The position detector 1 includes detecting units, that is, a GPS (Global Positioning System) receiver, a gyroscope, a distance sensor, and an earth magnetism sensor, which are not shown. The GPS receiver receives through a GPS antenna electrical waves transmitted from GPS satellites, and detects based on the received electrical waves a position, a heading direction, a velocity and the like of the vehicle. The gyroscope detects a degree of a rotational movement of the vehicle. The distance sensor detects a travel distance of the vehicle by detecting acceleration in the front-rear direction of the vehicle. The earth magnetism sensor detects the heading direction of the vehicle by detecting the earth magnetism. The detecting units are used in a complementary style, since they detect quantities with different types of detection errors. The position detector 1 may only have some of the detecting units. Otherwise, the position detector 1 may further have a steering rotation sensor or wheel rotation sensors.

The map data obtaining device 2 outputs to the controller 7 several kinds of data including map data, mark data, and data for map matching. The storage device for storing the several kinds of data may be a CD-ROM or DVD-ROM because of a requirement of its data volume; furthermore, a memory card or a magnetic storage device such as a hard disk can be alternatively used.

The map data include road data in which a map includes multiple nodes indicating intersections and the like and multiple links connecting two of the nodes. More specifically, the road data include link information indicating the following: link IDs each of which identifies a link; lengths of the links; two-dimensional coordinates (x, y) each of which indicates a start point or an end point of a link; widths of the links; road categories (such as toll roads); and road IDs each of which identifies a road (such as a route number or street number). The map data also include location name information, traffic information, facility information, and two-dimensional coordinates (x, y) each of which indicates a location corresponding to the information.

The operation switches 3 may be a touch panel formed on a screen of the display device 6 or may be mechanical key switches located around the display device 6. The touch panel and the display device 6 may be constructed as a laminated single body. The touch panel may be a pressure sensitive type touch panel, an electromagnetic induction type touch panel, or an electrical capacitance type touch panel. In addition, the touch panel may be composed of a combination of the pressure sensitive type touch panel, the electromagnetic induction type touch panel, and the electrical capacitance type touch panel.

The traffic information receiver 4 receives traffic information which is transmitted by using a frequency division multiple system from one of the traffic information broadcasting stations. The traffic information receiver 4 is tuned to a traffic information broadcasting station which is determined by the controller 7. The controller 7 stores, into its internal memory 7a, data (that is, frequency division multiple data) which the traffic information receiver 4 received from the traffic information broadcasting station; then, the controller 7 causes, according to need, the display device 6 to display road traffic information of VICS (Vehicle Information and Communication System) or RDS-TMC (Radio Data System-Traffic Message Channel).

The internal memory 7a of the controller 7, as a storage device, stores a broadcasting station list of broadcasting stations which are classified by the service regions. The broadcasting station list indicates correspondence between a certain service region and one (or more) reception station (reception channel) included in the traffic information broadcasting stations; namely, the traffic information receiver 4 can be tuned to the reception station in the certain service region.

The radio receiver 5 is a radio tuner which can be tuned to AM and FM radio broadcasting stations. The radio receiver 5 also receives traffic information which is transmitted by using a frequency division multiple system from one of the traffic information broadcasting stations. In this sense, the radio receiver 5 is a multipurpose radio receiver. The radio receiver 5 is tuned to a radio station which is specified by a user's instruction (or operation) or by the controller 7.

The display device 6 is a color display device and may be a liquid crystal display, a plasma display, or a CRT. The display device 6 can display on its screen a current position mark, a recommended route to a destination, names of locations, land marks, and marks of facilities; the current position mark is determined based on the current position of the vehicle detected by the position detector 1 and the map data from the map data obtaining device 2. The display device 6 may also display the traffic information on the screen.

The controller 7 mainly includes a well-known microcomputer having a CPU, a ROM, a RAM, an I/O, and bus lines connecting them, and executes programs stored in the ROM and the RAM as the internal memory 7a. By executing one of the programs, the controller 7 calculates based on detection signals from the position detector 1 the current position of the vehicle which includes a set of coordinates and a heading direction of the vehicle. The controller 7 also causes, by executing one of the programs, the display device 6 to display a map which is obtained from the map data obtaining device 2 and is surrounding the calculated current position of the vehicle. By executing one of the programs, the controller 7 also specifies a facility as a destination based on the operation of the user via the operation switches 3 and the map data in the map data obtaining device 2; then the controller 7 calculates, by using the Dijkstra method or the like, an optimum route from the current position to the destination.

By executing one of the programs, the controller 7 also stores a position specified by the operation of the user via the operation switches 3 (a position determined as the destination of route guidance) into the internal memory 7a (e.g., the RAM of the controller 7). The RAM is always supplied with electric power from a battery. The information in the RAM is therefore saved even when the navigation system 10 is shut down. By executing one of the programs, the controller 7 also executes the route guidance in which the controller 7 causes the display device 6 to display the recommended route to the destination and the current position of the vehicle.

Figure 2:
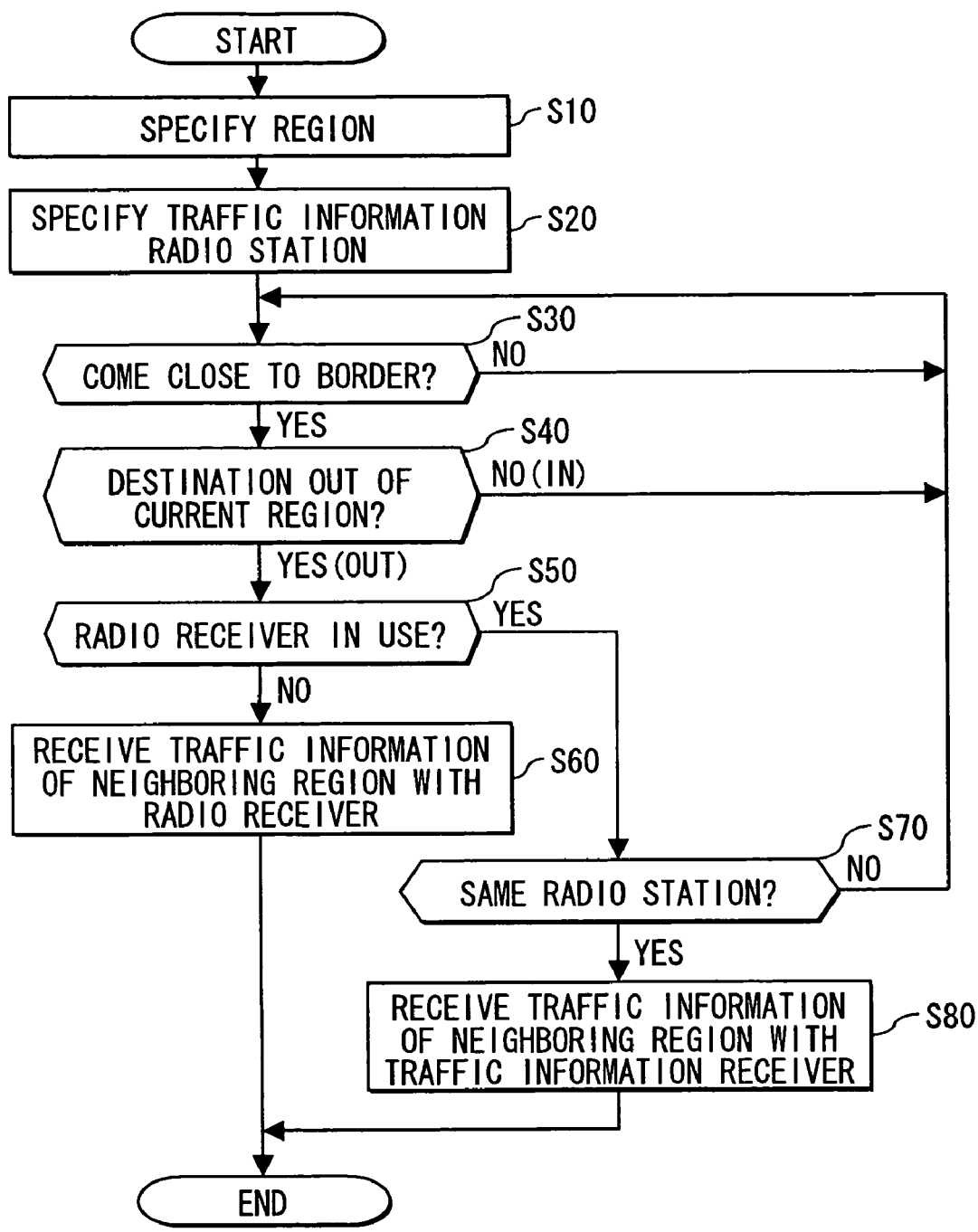
FIG. 2 is a flowchart diagram showing a process executed by the navigation system for selecting a broadcasting station.

By executing one of the programs, the controller 7 executes a reception station control process shown in FIG. 2. The controller 7 detects at Step S10 the current position of the vehicle and then determines, based on the detected current position and the map data, a service region to which the detected current position belongs.

At Step S20, the controller 7 specifies, based on the broadcasting station list stored in the internal memory 7a, a traffic information broadcasting station which broadcasts traffic information of the service region determined at Step S10. The controller 7 then outputs the specified traffic information broadcasting station to the traffic information receiver 4. The traffic information receiver 4 is accordingly tuned to the specified traffic information broadcasting station. The traffic information receiver 4 thus starts receiving the traffic information of the service region (hereinafter referred to as a current region) where the vehicle is currently located.

At Step S30, the controller 7 makes a determination whether the vehicle has come close to a border between the current region and a neighboring service region (hereinafter referred to as a neighboring region) adjacent to the current region. The determination is made based on the calculated current position of the vehicle and the map data from the map data obtaining device 2. The determination may be based on a linear distance from the current position to the border which is obtained from the map data. Otherwise, the determination may be based on a distance along the shortest route from the current position to the border. The shortest route may be determined based on the map data. Otherwise, the determination may be based on travel time needed for traveling the linear distance or the shortest route. The travel time may be calculated by a speed (such as a current speed, an average speed, or a predetermined speed) of the vehicle.

For example, the controller 7 may determine that the vehicle has come close to the border when the linear distance (otherwise, the distance along the shortest distance) decreases to several kilometers or several tens of kilometers. In this case, it is likely that the traffic information receiver 4 can receive traffic information of the neighboring region as well as the traffic information for the current region when the determination at Step S30 is affirmed. The determination at Step S30 is intended for keeping the controller 7 from executing unnecessary processes, based on the following two facts: that it is often impossible to receive the traffic information of the neighboring region when the vehicle is at the center of the current region because of dissipation of radio waves; and that it becomes possible to receive the traffic information of the neighboring region when the vehicle approaches the border.

When the determination at Step S30 is affirmative, the controller 7 subsequently executes Step S40. If the determination at Step S30 is negative, the controller 7 makes the determination at Step S30 again. At Step S40, the controller 7 makes a determination whether the destination for the route guidance is located out of the current region. The controller 7 subsequently executes Step S50 when the determination at S40 is affirmative. The controller 7 subsequently executes Step S30 again when the determination at S40 is negative, that is, when the destination for the route guidance is located in the current region.

At Step S50, the controller 7 makes a determination whether the radio receiver 5 is in use (for example, in use for an FM radio program). The determination may be based on whether or not the radio receiver 5 is tuned to a broadcasting station. Otherwise, the determination may be based on whether or not the controller 7 is receiving information from the radio receiver 5 which is tuned to a broadcasting station. Otherwise, the determination may be based on whether or not the controller 7 is causing a sound outputting device (not shown) to output a sound of a radio program based on a signal from the radio receiver 5 which is tuned to a broadcasting station. When the determination at Step S50 is negative, the controller 7 subsequently executes Step S60, since it is possible to receive traffic information of the neighboring region by using the radio receiver 5. When the determination is negative, the controller 7 subsequently executes Step S70.

At Step S60, the controller 7 specifies by using the broadcasting station list a traffic information broadcasting station broadcasting the traffic information of the neighboring region (in other words, a service region outside of the current region). Then the controller 7 outputs the specified traffic information broadcasting station to the radio receiver 5. The radio receiver 5 is accordingly activated and tuned to the specified traffic information broadcasting station. The controller 7 thus obtains the traffic information of the neighboring region by using the radio receiver 5 when the radio receiver 5 is not used by the user for receiving a radio program.

At Step S70, the controller 7 makes a determination whether the broadcasting station which the traffic information receiver 4 is tuned to and the broadcasting station which the radio receiver 5 is tuned to are the same. The controller 7 subsequently executes Step S80 when the determination at Step S70 is affirmative. The controller 7 subsequently executes Step S30 again when the determination at Step S70 is negative.

At Step S80, the controller 7 specifies by using the broadcasting station list a traffic information broadcasting station broadcasting the traffic information of the neighboring region (in other words, a service region outside of the current region). Then the controller 7 outputs the specified traffic information broadcasting station to the radio traffic information receiver 4. The traffic information receiver 4 is accordingly tuned to the specified traffic information broadcasting station. The traffic information receiver 4 thus starts receiving the traffic information of the neighboring region.

In the case that the broadcasting station which the traffic information receiver 4 is tuned to and the broadcasting station which the radio receiver 5 is tuned to are the same, the same traffic information is received by both the receivers 4 and 5. It is not necessary to receive the same traffic information by using both the receivers 4 and 5. As described above, the controller 7 tunes at Step S80 the traffic information receiver 4 to the traffic information broadcasting station broadcasting the traffic information of the neighboring region, while letting the radio receiver 5 receive the traffic information of the current region. Thus, it is possible to receive, by using the traffic information receiver 4, the traffic information of the neighboring region while receiving, by using the radio receiver 5, the traffic information of the current region.

As described above, the navigation system 10 of the present example embodiment makes the determination whether the radio receiver 5 is in use or not, when the traffic information receiver 4 is receiving the traffic information of the current region and the vehicle has come close to the border between the current region and the neighboring region. The navigation system 10 tunes, based on the determination, one of the traffic information receiver 4 and the radio receiver 5 to the traffic information broadcasting station broadcasting the traffic information of the neighboring region.

The navigation system 10 thus does not simply tune, based on the current position of the vehicle, the radio receiver 5 to the traffic information broadcasting station broadcasting the traffic information of the neighboring region. It is therefore possible to receive simultaneously traffic information of multiple service regions and to provide the user with the traffic information of the multiple service regions without delay, while keeping the radio receiver 5 available for receiving other information such as a music program.

The traffic information of the neighboring region is not very important when the destination set by the user is included in the current region; necessary traffic information is only limited to the traffic information of the current region which the traffic information receiver 4 has received. In contrast, the traffic information of the neighboring region may be useful for the user when the destination is out of the current region.

The navigation system 10 therefore tunes at Steps S60 and S80 the radio receiver 5 or the traffic information receiver 4 to the traffic information broadcasting station for the neighboring region, when it determines at Step S40 that the destination is out of the current region. It is therefore possible to receive the useful traffic information around the destination by using the radio receiver 5 or the traffic information receiver 4.

The above-explained example embodiment may be modified without limit within the scope of the present invention.

For example, the controller 7 may bypass the determination of Step S40 after Step S30 to execute Step S50 and its following steps, when the destination has not determined yet by the user.

The multiple service regions for each of which traffic information is broadcasted are not limited to administrative districts such as prefectures. For example, the multiple service regions may be countries or any types of districts.

Figure 3:
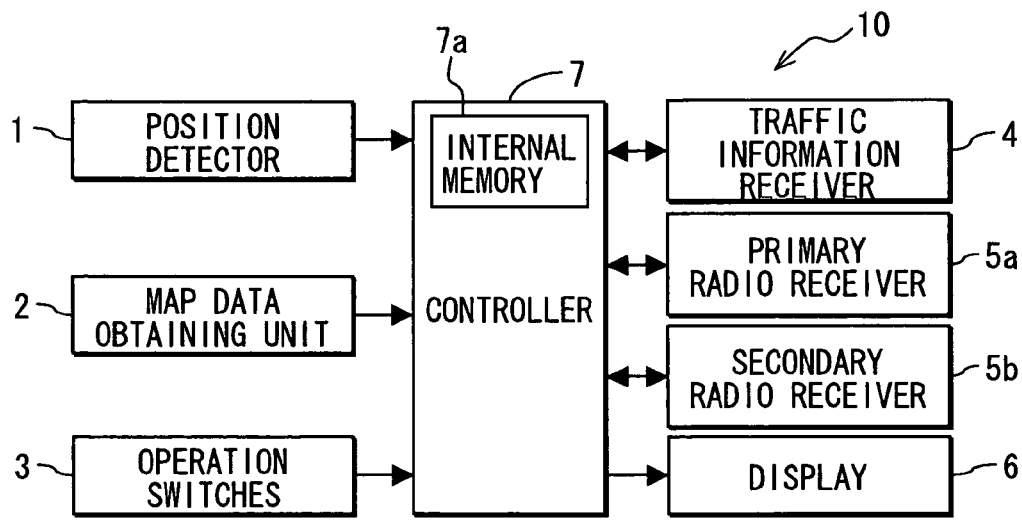
FIG. 3 is block diagram showing a structure of another navigation system according to a modification of the example embodiment, which includes a primary radio receiver and a secondary radio receiver.

As shown in FIG. 3, the navigation system 10 may have, in place of the radio receiver 5, two radio receivers, that is, a primary radio receiver 5a and a secondary radio receiver 5b which have functions similar to those of the radio receiver 5. In this case, the navigation system 10 may execute a control process shown in FIG. 4 by using the primary radio receiver 5a and the secondary radio receiver 5b in a complementary style in which the controller 7 switches between the primary radio receiver 5a and the secondary radio receiver 5b.

Figure 4:
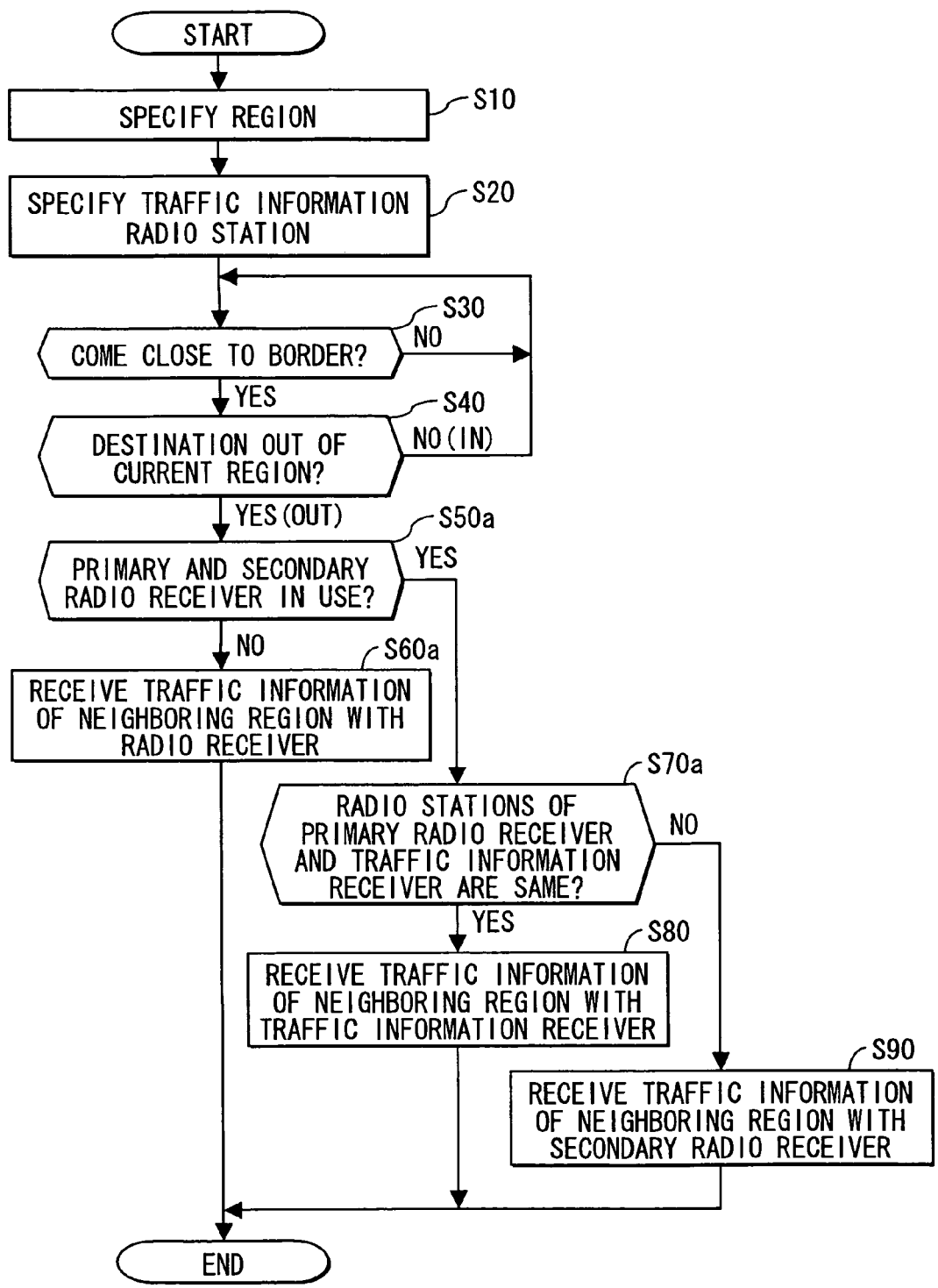
FIG. 4 is a flowchart diagram showing a process executed by the navigation system shown in FIG. 3 for selecting a broadcasting station.

In the control process shown in FIG. 4, the primary radio receiver 5a is preferentially used compared to the secondary radio receiver 5b. Operations of the controller 7 in Steps S10 to S40 and Step S80 in FIG. 4 are the same as those in Steps S10 to S40 and Step S80 in FIG. 2.

When the determination at Step S40 is affirmative, that is, when the destination is out of the current region, the controller 7 makes at Step S50a a determination whether both the primary radio receiver 5a and the secondary radio receiver 5b are in use. The controller 7 subsequently executes Step S60a when the determination at Step S40 is negative, since it is possible to use the primary radio receiver 5a or the secondary radio receiver 5b to receive the traffic information in the neighboring region. The controller 7 subsequently executes Step S70a when the determination at Step S40 is affirmative.

At Step S60a, the controller 7 specifies by using the broadcasting station list a traffic information broadcasting station broadcasting the traffic information of the neighboring region (in other words, a service region outside of the current region). Then the controller 7 outputs the specified traffic information broadcasting station to either of (i) the primary radio receiver 5a in not use or (ii) the secondary radio receiver 5b in not use when the primary radio receiver 5a is in use. Either radio receiver 5a or 5b in not use is accordingly activated and tuned to the specified traffic information broadcasting station. The controller 7 thus obtains the traffic information of the neighboring region by using either radio receiver 5a or 5b is not in use at the determination at Step S50.

At Step S70a, the controller 7 makes a determination whether the broadcasting station which the traffic information receiver 4 is tuned to and the broadcasting station which the primary radio receiver 5a is tuned to are the same. The controller 7 subsequently executes Step S80 when the determination at Step S70a is affirmative. The controller 7 subsequently executes Step S90 when the determination at Step S70a is negative. The determination at Step S70a makes it clear whether the primary radio receiver 5a is receiving the traffic information of the current region.

At Step S90, the controller 7 temporarily stops using in the complementary style the primary radio receiver 5a and the secondary radio receiver 5b; namely, the controller 7 stops control of switching between the radio receivers 5a, 5b. The controller 7 specifies by using the broadcasting station list a traffic information broadcasting station broadcasting the traffic information of the neighboring region (in other words, a service region outside of the current region). Then the controller 7 outputs the specified traffic information broadcasting station to the secondary radio receiver 5b. The secondary radio receiver 5b is accordingly tuned to the specified traffic information broadcasting station. The controller 7 thus obtains the traffic information of the neighboring region by using the secondary radio receiver 5b, while obtaining the traffic information of the current region by using the traffic information receiver 4 and while continuing to obtain information that the user has selected by using the primary radio receiver 5a.

The controller 7 may determine at Step S30 in FIG. 2 that the vehicle has come close to the border when the linear distance (otherwise, the distance along the shortest distance) decreases to several hundreds meters.

The process at Steps 70a, S80, and S90 can be differently designed. For instance, when both the traffic information receiver 4 and the primary radio receiver 5a are receiving the traffic information of the current region, either of the receivers 5a, 5b may be changed to receive the traffic information of the neighboring region while the traffic information receiver 4 continues receiving the traffic information of the current region.

Furthermore, the navigation system 10 can have more than one secondary radio receivers 5b, each of which has functions similar to those of the radio receiver 5. That is, the navigation system 10 can be designed to have the traffic information receiver 4 and more than two radio receivers 5. This may allow the navigation system 10 to further receive additional information from various radio stations at the same time.

Furthermore, in the above example embodiment, the traffic information receiver 4 can be substituted by another radio receiver having the same functions as those of the radio receiver 5. That is, the navigation system includes two radio receivers 5 and one of the two radio receivers 5 may be preferentially used for receiving the traffic information of the current region.

Each or any combination of processes or steps explained in the above can be achieved as a software unit (e.g., subroutine) and/or a hardware unit (e.g., circuit or integrated circuit), including or not including a function of a related device; furthermore, the hardware unit can be constructed inside of a microcomputer.

It will be obvious to those skilled in the art that various changes may be made in the above-described example embodiments of the present invention. However, the scope of the present invention should be determined by the following claims.

What is claimed is:

1. A wireless broadcast receiving device for a vehicle, comprising:

a first receiver that wirelessly receives traffic information from one of a plurality of traffic information broadcasting stations;

a second receiver that wirelessly and selectively receives one of (i) traffic information from one of the traffic information broadcasting stations and (ii) a radio program from a radio broadcasting station;

a storage device that stores correspondence data that associates each of the traffic information broadcasting stations with a certain region included in a plurality of regions, wherein traffic information from the each of the traffic information broadcasting stations is receivable in the certain region;

a position detector that detects a current position of the vehicle; and a controller that includes a tuning unit that tunes the first receiver and the second receiver to the traffic information broadcasting stations based on the detected current position and a determining unit that makes a determination whether or not the second receiver is in use when the vehicle approaches a border between (i) a current region including the current position and (ii) a neighboring region adjacent to the current region, while the first receiver is tuned to a first station of the traffic information broadcasting stations which is associated with the current region, wherein the tuning unit tunes one of the first receiver and the second receiver to a second station of the traffic information broadcasting stations which is associated with the neighboring region, based on the determination made by the determining unit.

2. The wireless broadcast receiving device of claim 1, wherein when the determination made by the determining unit is negative, the tuning unit tunes the second receiver to the second station.

3. The wireless broadcast receiving device of claim 1, wherein when the determination is affirmative, the determining unit makes an additional determination whether a broadcasting station, to which the second receiver is tuned, accords with the first station, and when the additional determination is affirmative, the tuning unit tunes the first receiver to the second station.

4. The wireless broadcast receiving device of claim 1, further comprising:

a third receiver for wirelessly and selectively receiving one of (i) traffic information from one of the traffic information broadcasting stations and (ii) a radio program from a radio broadcasting station, wherein the determining unit further makes a determination whether the third receiver is also in use when the second receiver is determined to be in use.

5. The wireless broadcast receiving device of claim 4, wherein, when it is determined that both the second receiver and the third receiver are in use, the determining unit determines an additional determination whether a broadcasting station, to which the second receiver, accords with the first station.

6. The wireless broadcast receiving device of claim 5, wherein, when the broadcasting station to which the second receiver is determined to be not according with the first station, the tuning unit tunes the third receiver to the second station.

7. The wireless broadcast receiving device of claim 5, wherein, when the broadcasting station to which the second receiver is determined to be according with the first station, the tuning unit tunes the first receiver to the second station.

8. The wireless broadcast receiving device of claim 1, wherein the controller includes a destination determination unit for determining whether a destination of the vehicle is out of the current region, and the determining unit makes any determination only when the destination is determined to be out of the current region.

9. The wireless broadcast receiving device of claim 1, wherein the first receiver selectively receives one of (i) traffic information from one of the traffic information broadcasting stations and (ii) a radio program from a radio broadcasting station, like the second receiver.

10. A wireless broadcast receiving device for a vehicle, comprising:

a first receiver that wirelessly receives traffic information from one of a plurality of traffic information broadcasting stations;

a second receiver that wirelessly and selectively receives one of (i) traffic information from one of the traffic information broadcasting stations and (ii) a radio program from a radio broadcasting station;

a storage device that stores correspondence data that associates each of the traffic information broadcasting stations with a certain region included in a plurality of regions, wherein traffic information broadcasted from the each of the traffic information broadcasting stations is receivable in the certain region;

a position detector that detects a current position of the vehicle; and a controller that includes a tuning unit that tunes the first receiver to a first station of the traffic information broadcasting stations which is associated with a current region including the current position, and tunes the second receiver to a second station of the traffic information broadcasting stations which is associated with a neighboring region adjacent to the current region when the second receiver is not in use when the vehicle approaches a border between (i) the current region and (ii) the neighboring region; and a determining unit that makes a determination whether a broadcasting station, to which the second receiver is tuned, accords with the first station when the second receiver is in use when the vehicle approaches the border, wherein when the broadcasting station to which the second receiver is tuned is determined to be according with the first station, the tuning unit switches a traffic information broadcasting station, to which the first receiver is tuned, from the first station to the second station.

11. The wireless broadcast receiving device of claim 10, further comprising:

a third receiver for wirelessly and selectively receiving one of (i) traffic information from one of the traffic information broadcasting stations and (ii) a radio program from a radio broadcasting station, wherein:

when at least one receiver of the second receiver and the third receiver is not in use, the tuning unit tunes the first receiver to the first station and tunes the at least one receiver in not use to the second station when the vehicle approaches the border;

the determining unit makes the determination whether the broadcasting station, to which the second receiver is tuned, accords with the first station when both the second receiver and the third receiver are in use when the vehicle approaches the border; and when the broadcasting station, to which the second receiver is tuned, is determined to be not according with the first station, the tuning unit tunes the third receiver to the second station.

12. A wireless broadcast receiving device for a vehicle, comprising:

a first receiver that wirelessly receives traffic information from one of a plurality of traffic information broadcasting stations;

a second receiver that wirelessly and selectively receives one of (i) traffic information from one of the traffic information broadcasting stations and (ii) a radio program from a radio broadcasting station;

a storage device that stores correspondence data that associates each of the traffic information broadcasting stations with a certain region included in a plurality of regions, wherein traffic information from the each of the traffic information broadcasting stations is receivable in the certain region;

a position detector that detects a current position of the vehicle;

tuning means for tuning the first receiver and the second receiver to the traffic information broadcasting stations based on the detected current position;

determining means for making a determination whether the second receiver is in use when the vehicle approaches a border between (i) a current region including the current position and (ii) a neighboring region adjacent to the current region, while the first receiver is tuned to a first station of the traffic information broadcasting stations which is associated with the current region, wherein the tuning means selectively tunes one of the first receiver and the second receiver to a second station of the traffic information broadcasting stations which is associated with the neighboring region, based on the determination made by the determining means.

13. A method used in a wireless broadcast receiving device for a vehicle, the device including:

a first receiver that wirelessly receives traffic information from one of a plurality of traffic information broadcasting stations;

a second receiver that wirelessly and selectively receives one of (i) traffic information from one of the traffic information broadcasting stations and (ii) a radio program from a radio broadcasting station;

a storage device that stores correspondence data that associates each of the traffic information broadcasting stations with a certain region included in a plurality of regions, wherein traffic information broadcasted from the each of the traffic information broadcasting stations is receivable in the certain region; and a position detector that detects a current position of the vehicle, the method comprising:

tuning the first receiver to a first station of the traffic information broadcasting stations which is associated with a current region including the current position;

making a first determination whether the vehicle approaches a border between (i) the current region and (ii) a neighboring region adjacent to the current region;

making a second determination whether the second receiver is in use, when the first determination is affirmative; and selectively tuning one of the first receiver and the second receiver to a second station of the traffic information broadcasting stations which is associated with the neighboring region, based on a result of the second determination.

* * * * *